Nov. 4, 1941.   R. P. LOWE   2,261,655
CONTINUOUS WEIGHING APPARATUS
Filed Jan. 15, 1938   5 Sheets-Sheet 1

Rudy P. Lowe
INVENTOR

BY Maxwell Barus
ATTORNEY

Nov. 4, 1941.   R. P. LOWE   2,261,655
CONTINUOUS WEIGHING APPARATUS
Filed Jan. 15, 1938   5 Sheets-Sheet 3

Rudy P. Lowe
INVENTOR

BY Maxwell Barus
ATTORNEY

Patented Nov. 4, 1941

2,261,655

UNITED STATES PATENT OFFICE 2,261,655

CONTINUOUS WEIGHING APPARATUS

Rudy P. Lowe, Cranston, R. I., assignor to Builders Iron Foundry, Providence, R. I., a corporation of Rhode Island Application January 15, 1938, Serial No. 185,181

6 Claims. (Cl. 265—28)

This invention relates to the weighing of material and more especially to the integrating of weights of material on a continuously moving conveyor. An object of the invention is to provide novel, efficient and advantageous mechanism for the accurate integration of weights of said material. In its more specific aspects, the invention comprises novel means responsive with speed and precision to cyclical signals of a function of time corresponding with weights of material passing over a scale for integrating said weights. The invention further includes provisions for insuring accurate integrator response even for small weights on the conveyor.

Other features and advantages of the invention will be hereinafter described and claimed.

In the accompanying drawings, Figure 1 is a diagrammatic view illustrating an embodiment of the invention in which the rate of delivery of a substance is controlled to a desired proportion to the rate of delivery of another substance.

Figure 1:
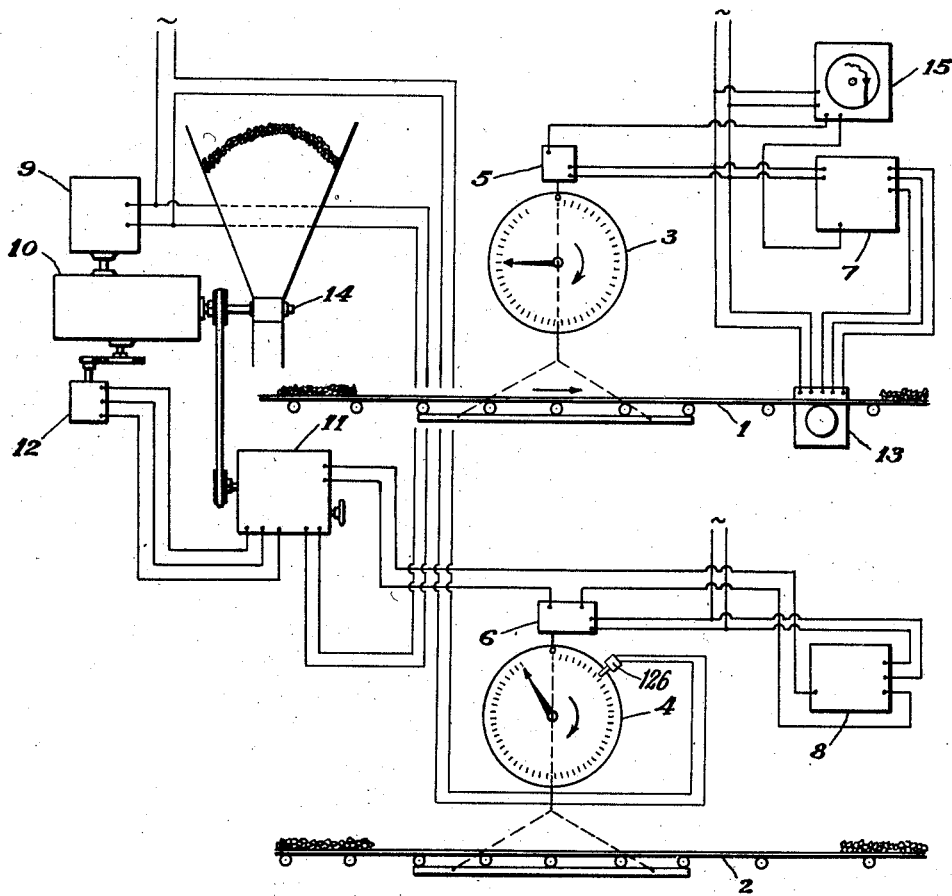

Referring to the drawings, there is shown in Fig. 1 a schematic layout of the main units of one embodiment in which the flow of material on the continuously traveling endless belt 1 is considered the dependent quantity to be controlled to a desired proportion to a master quantity, which, in this instance, is the flow of material on the continuously traveling endless belt 2. Scale 3 of well-known design measures the weight of material on a section of belt 1 and scale 4, similarly of well-known design, measures the weight of material on a section of belt 2. Connected to scale 3 and positioned thereby is telemetric transmitter 5 which cyclically sends electrical impulses to totalizer 7 and recorder 15 of time duration corresponding to the weight on scale 3. Connected to scale 4 and positioned thereby is telemetric transmitter 6 which cyclically sends two electrical impulses to totalizer 8 of time durations corresponding to weight on scale 4 plus a constant, and a constant, the first of said signals also being sent to differential speed controller 11. Motor 9 drives a variable speed device 10 which operates a feeding device 14 for the material on belt 1. The differential speed controller 11 is driven by the output shaft of the variable speed devices 10 and is controlled jointly by the output speed of device 10 and telemetric impulses from transmitter 6. The differential speed controller 11 controls the operation of reversible motor 12, which in turn regulates the speed ratio between motor 9 and feeder 14 in a well-known manner. Totalizer 7 is driven in synchronism with a belt speed compensator 13. The recorder 15 may be of any suitable type operable by telemetric impulses of time duration corresponding to the quantity measured.

Underload limit switch 126 on scale 4 stops motor 9 and differential speed controller 11 when the load on scale 4 falls below the normal operating range. It is understood that other supplementary controls well-known in the art may be applied such as switches to stop various parts of system if either belt drive fails or if the load on either belt becomes excessive or if the supply of material for either belt fails.

Figure 2:
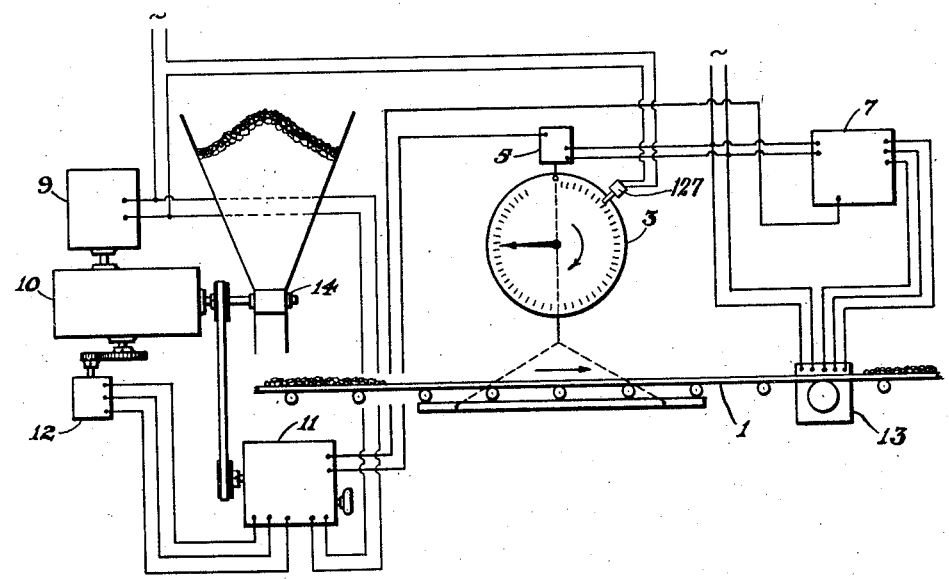
Figure 2 is a diagrammatic view showing an embodiment wherein the rate of delivery of a substance is controlled in accordance with a set rate.

In Figure 2 a continuous and constant rate of flow of material on belt 1 is maintained by controlling the speed of feeder 14. Scale 3 measures the weight of material on a section of belt 1. Connected to scale 3 and positioned thereby is telemetric transmitter 5 which cyclically sends to totalizer 7 and differential speed controller 11 electrical impulses of time duration corresponding to the weight on scale 3. Motor 9 drives variable speed device 10 which operates a feeding device 14 for the material on belt 1. Driven by the output shaft of the variable speed device 10 is a differential speed controller 11 which is controlled jointly by the output speed of device 10 and the telemetric impulses from transmitter 5. The differential speed controller 11 controls the operation of reversible motor 12, which in turn regulates the speed ratio between motor 9 and feeder 14 in a manner well known in the art.

Underload limit switch 127 on scale 3 stops motor 9 and differential speed controller 11 when the load on scale 3 falls below the normal operating range. Other supplementary controls may be applied as described under Fig. 1.

Figure 3:
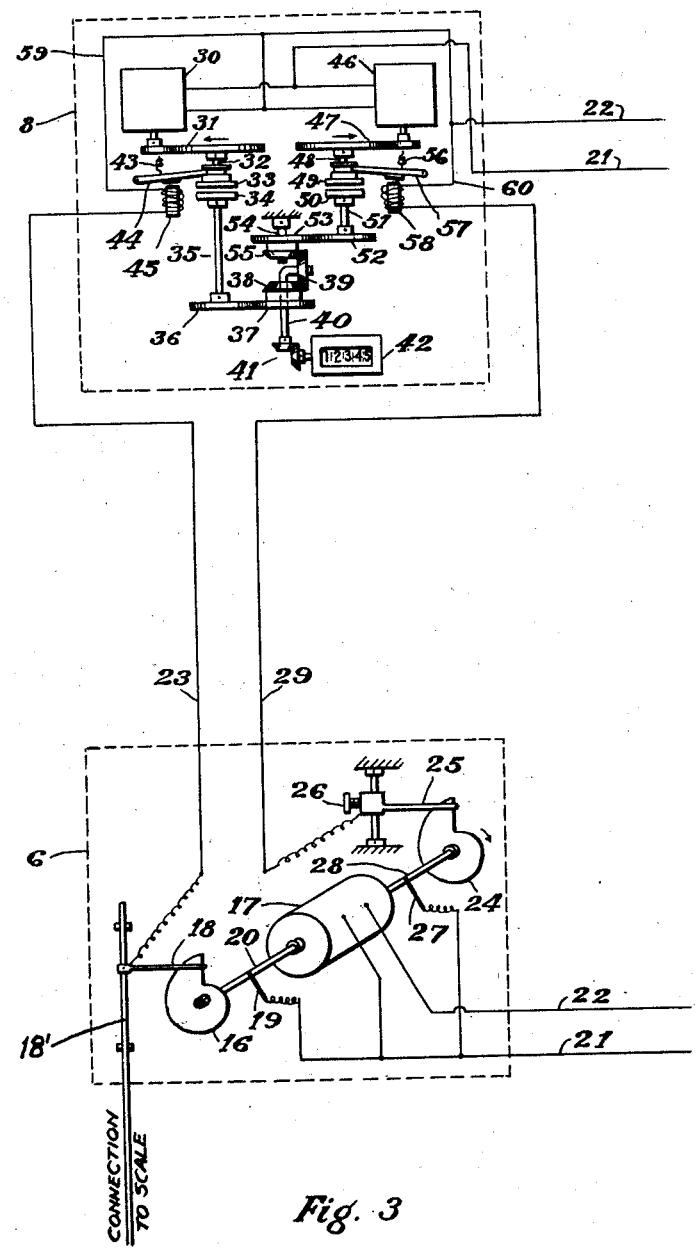
Figure 3 is a view illustrating a transmitter for sending signals corresponding to a constant and a constant plus a variable, in combination with an integrator operable in accordance with the difference between said signals to integrate the net weight.

Figure 3 illustrates the elements of transmitter 6 and totalizer 8 of Fig. 1. In transmitter 6 is a cam 16 continuously rotated by synchronous motor 17. Co-acting with cam 16 is contact 18 connected by link 18' with an element of the scale so as to be positioned in accordance with the net load on the scale. Said contact 18 is thereby so positioned with respect to cam 16 as to engage said cam during each cycle for a time duration corresponding to the load on scale 4. Connected to cam 16 by means of a brush 19 on shaft 20 is wire 21 of a pair 21 and 22 from a suitable source of electrical energy. Wires 21 and 22 are connected to motor 17 for driving said motor. When contactor 18 engages cam 16 a circuit is completed from wire 21 through wire 23 to one side of totalizer 8. Also driven by motor 17 is cam 24. Co-acting with cam 24 is contactor 25 manually adjustable with respect to cam 24, and held in adjusted position by means of lockscrew 26. Wire 21 is connected to cam 24 by means of a brush 27 on shaft 28. When contact 25 engages cam 24 a circuit is completed from wire 21 through wire 29 to the other side of totalizer 8. In totalizer 8 synchronous motor 30 continuously drives through gearing 31, a shaft 32 on which is splined a slidable member 33 adapted to engage a member 34 on shaft 35. Also on shaft 35 is gear 36 which drives gear 37 journaled on shaft 40 and to which is attached gear 38 which forms half of a differential drive for counter 42. Gear 38 drives pinion 39 which is journaled on an arm of shaft 40. Counter 42 is driven by shaft 40 by suitable gears 41. Member 33 is normally held away from member 34 by spring 43 attached to arm 44. Solenoid 45, however, attracts arm 44 when energized by electrical impulses from cam 16 and contactor 18, and thereby causes engagement of member 33 with member 34 for driving counter 42 by motor 30.

Synchronous motor 46 continuously drives through gearing 47, a shaft 48 on which is splined a slidable member 49 adapted to engage a member 50 on shaft 51. Also on shaft 51 is gear 52 which drives gear 53 journaled on shaft 54 and to which is attached gear 55 which forms the other half of a differential drive for counter 42. Gear 55 drives pinion 39 in a direction opposite to that in which pinion 39 is driven by gear 38.

Member 49 is normally held away from member 50 by spring 56 attached to arm 57. Solenoid 58, however, attracts arm 57 when energized by electrical impulses from cam 24 and contactor 25 and thereby causes engagement of member 49 with member 50 for driving counter 42 by motor 46.

Wire 23 is connected to solenoid 45 and the circuit is completed through wire 59 to wire 22 from the source of electrical energy. Wire 29 is connected to solenoid 58 and through wire 60 to wire 22 of the source of electrical energy. Synchronous motors 30 and 46 are each connected to the source of electrical energy through wires 21 and 22 and are continuously in operation, as is synchronous motor 17. It will, of course, be obvious that the gears 31, 47 could be driven continuously in opposite directions by a single synchronous motor, though for purposes of illustration I have shown two motors for operating said gears.

The operation of the apparatus shown in Fig. 3 is as follows: In transmitter 6, contactor 18 engages cam 16 in each cycle for a time duration, the length of which varies according to the weight on scale 4 of Fig. 1. Contactor 25 engages cam 24 in each cycle for a time duration, the length of which depends on pre-set position of contactor 25. The correct position of contactor 25 can be determined by running the belt 2 without load across scale 4 and adjusting contactor 25 to engage cam 24 so that the total duration of impulses therefrom will be equal to the total duration of impulses from contactor 18 with cam 16, while the belt makes at least one complete revolution. When this adjustment is correct, the sum of the signals in lines 23 and 29 will be equal, members 33—34 and 49—50 of totalizer 8 will be engaged for equal total periods, and since they are driven in opposite directions by two synchronous motors or by the same motor, the consequent movement of the counter 42 will be nil. Having been once adjusted in this way, the contactor 25 and cam 24 continue to send in each cycle signals to solenoid 58, which effect a subtraction from the signals as sent by contactor 18 and cam 16 to solenoid 45. The counter 42 therefore shows the difference between the signals or the net weight on scale 4.

It is understood that supplementary switches well-known in the art may be applied to stop motors 30 and 46 if the belt drive fails, so that continued integration of a stationary load on scale 4 will not occur.

Figure 4:
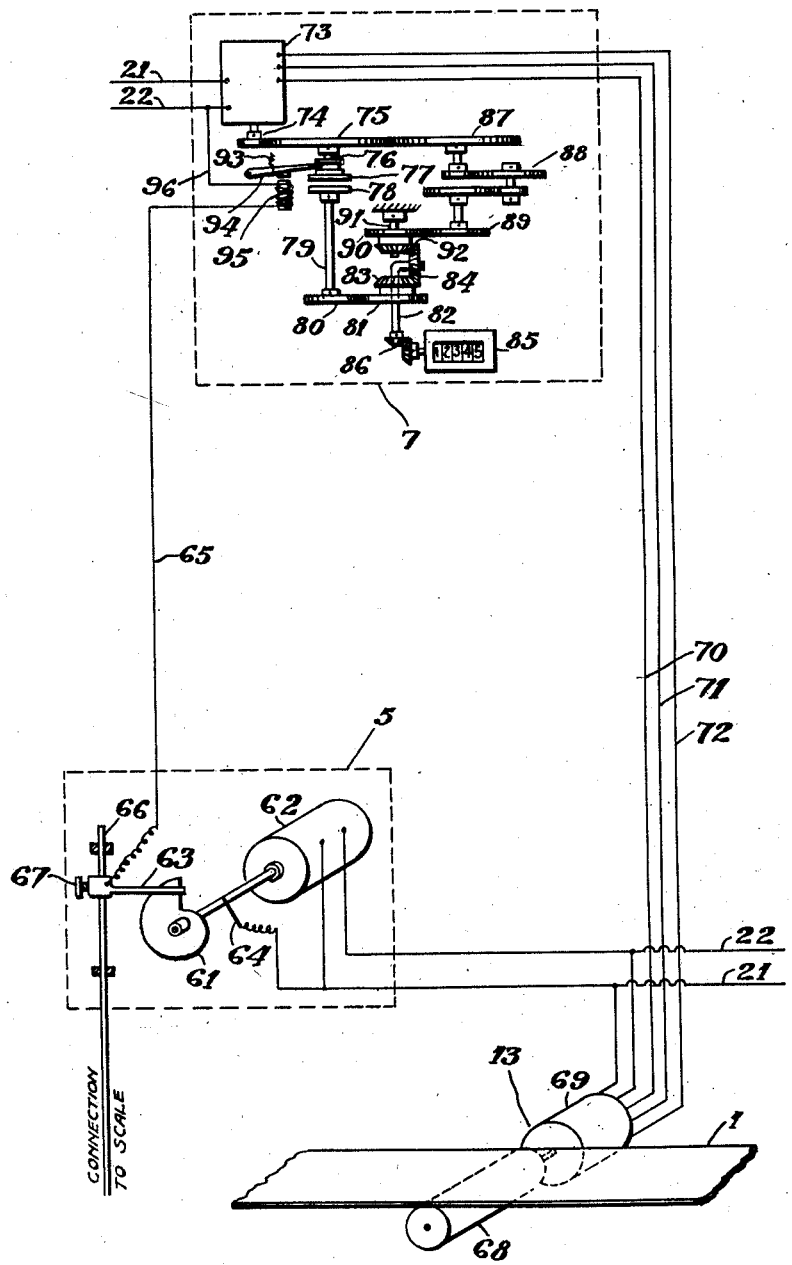
Figure 4 is a view showing a modified form of transmitter and integrator.

While the transmitter 5 and totalizer 7 of Fig. 1 may be the same as transmitter 6 and totalizer 8 above described, they may alternatively be constructed and arranged as illustrated in Fig. 4. In the latter figure the transmitter 5 is shown as comprising a cam 61 continuously rotated by synchronous motor 62 and coacting with a contactor 63 which is positioned with respect to cam 61 on being connected to a suitable element in scale 3 which deflects in accordance with the net load on scale 3. In this instance said scale may be of a well-known type in which the tare or empty belt weight is automatically eliminated in the arrangement of the scale levers. Cam 61 is connected by brush 64 to wire 21 from a suitable source of electrical energy. When contactor 63 engages cam 61, a circuit is thereby completed from wire 21 through brush 64, cam 61 and contactor 63 to wire 65 which leads to the totalizer 7. Contactor 63 is slidably mounted on rod 66 and is further provided with a lockscrew 67 for manual adjustment and locking of contactor 63 with respect to rod 66. Synchronous motor 62 is connected to a suitable source of electrical energy through wires 21 and 22.

Belt speed compensator 13 consists of a roller 68 driven by engagement with the continuously traveling belt 1. Connected to roller 68 is generator 69 which is connected to a suitable source of electrical energy through wires 21 and 22, and also, through wires 70, 71, and 72, to motor 73 of totalizer 7. Motor 73 is also connected to a suitable source of electrical energy through wires 21 and 22. Generator 69 and motor 73 constitute a well-known means of electrically transmitting rotation from one point to another, which is sometimes referred to as a synchronous drive (being here illustrated as the conventional "Selsyn" motor type of synchronous drive. The rotation imparted to roller 68 by the belt 1 is continuously reproduced by the motor 73, which rotates in synchronism with the generator 69. On the shaft of motor 73 is gear 74 which engages gear 75 on shaft 76. The latter is thus continuously driven by the motor 73 at a speed proportional to the speed of rotation of the roller 68, and hence to the speed of travel of the belt 1. Splined to shaft 76 is slidable member 77 adapted to engage member 78 on shaft 79. Also on shaft 79 is gear 80 which drives gear 81 journaled on shaft 82. Attached to gear 81 is gear 83 which constitutes one half of a differential for driving pinion 84 journaled to an arm of shaft 82 which in turn drives counter 85 through suitable gearing 86. Meshing with gear 75 is gear 87 which, through suitable reduction gearing 88, drives a gear 89. The latter drives gear 90 journaled on shaft 91. Attached to gear 90 is gear 92 which constitutes the other half of the differential for driving pinion 84 in the opposite direction to which it is driven by gear 83. The gears 87, 88, 89, 90, and 92 turn the pinion 84 in such direction as to drive the counter 85 subtractively.

Member 77 is normally held disengaged from member 78 by spring 93 which acts on arm 94. When contactor 63 engages cam 61, however, solenoid 95 is energized and attracts arm 94 which causes engagement of member 77 with member 78 and consequent operation of gear 83 of the differential gearing. The circuit through solenoid 95 is completed by wire 96 to wire 22.

The operation of the apparatus shown in Fig. 4 is as follows:

Contactor 63 is adjusted and locked on rod 66 at such a position relative to cam 61 that, with the belt 1 empty, there is produced in each cycle a signal or current impulse of such duration through solenoid 95 as to maintain member 77 engaged with member 78 of totalizer 7 sufficiently to exactly balance the continuous subtractive drive of the gears 87, 88, 89, 90, and 92. Thus, for zero load on the belt the counter or integrator 85 is not operated, and the contactor 63 engages cam 61 for a period such as to balance the subtractive operation of gear 92. When a load is placed on the belt 1, the rod 66 (and with it the contactor 63) is positioned by scale 3 in accordance with said load, and the duration of engagement between contactor 63 and cam 61 then equals the period of engagement corresponding to zero load plus the period proportional to the load on the belt portion which acts upon the scale. The counter 85 is thereby operated additively through an extent commensurate with the load or net weight aforesaid. By sending a signal to solenoid 95 in each cycle of a duration sufficient to nullify the effect of gears 87—92 and of an additional duration proportional to the load on the belt section on scale 3, a highly accurate transmission of signals is insured, even for very small values of the net weight. Solenoid 95, in short, is energized in each cycle for a time duration corresponding to the sum of a signal representing the net weight on the scale plus the constant above referred to corresponding to zero net weight.

Adjustment of contactor 63 on rod 66 for correct zero setting is accomplished by running the belt 1 (Fig. 1) unloaded across the scale and setting contactor 63 at the position which produces in successive cycles signals, the total duration of which for at least one complete revolution of belt 1, causes engagement of members 77 and 78 to drive gear 83 exactly the same distance that gear 92 is driven during the same period by gears 87, 88, 89 and 90. When this condition is attained, the resulting movement of counter 85 will be nil.

The total weight of material passing over scale 3 (Fig. 1) is the product of the weight on the scale at any moment and the speed of its passage. When the belt speed is constant, the totalizer can be driven by a synchronous or other constant speed motor and by suitably choosing the gear ratios in the totalizer, true totals will be shown by the counter. However, when the belt speed is not constant, the totalizer must be driven in accordance therewith, in order that the counter will show true totals. This is conveniently accomplished by the use of the self-synchronous drive above described, comprising the generator 69 and motor 73 connected by wires 70, 71 and 72.

It will be apparent that the transmitter and totalizer employed in connection with belt 2 in Figure 1 may be of the same type as transmitter 5 and totalizer 7, if desired; or the transmitter and totalizer, employed in conjunction with belt 1, may be the same type as the transmitter 6 and totalizer 8. Each belt 1 or 2 may be utilized in conjunction with transmitter 5 or transmitter 6, along with the corresponding type of totalizer 7 or 8.

Also it will be clear that, if desired, the motors 30 and 46 of totalizer 8 (Fig. 3) may be replaced by self-synchronous motors (or by a single self-synchronous motor) such as 73 (Fig. 4) operated in synchronism with a generator (such as 69, Fig. 4) driven by the belt 2. This, as above noted, is especially desirable where the belt speed is not constant.

Figure 5:
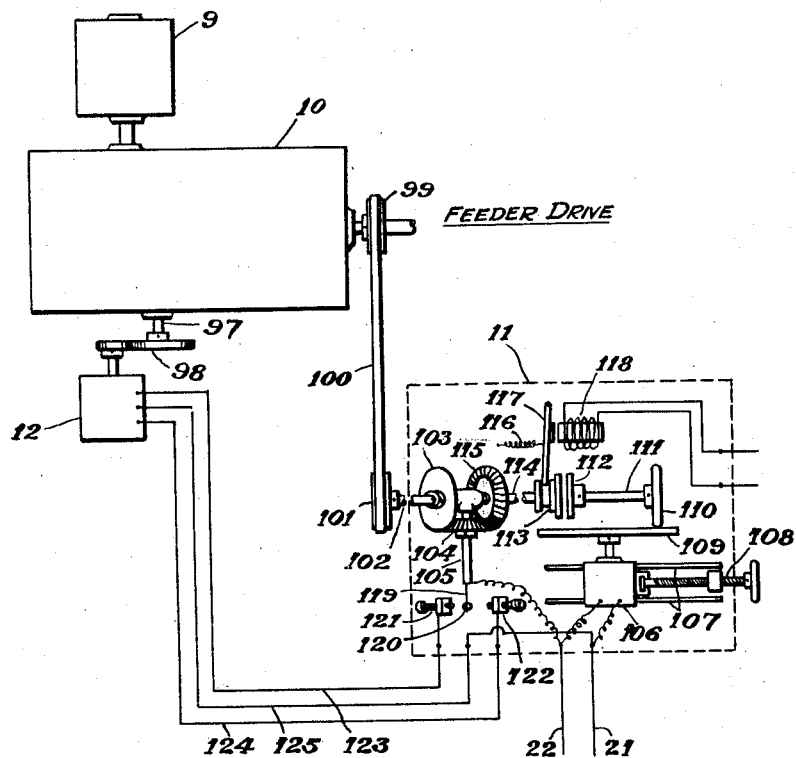
Figure 5 is a view illustrating an embodiment of a means responsive to transmitter signals for controlling the rate of delivery of a substance.

Fig. 5 illustrates the control apparatus 9, 10, 11 and 12 of Figures 1 and 2. A driving motor 9 constitutes the input to a variable speed device 10 of conventional type, the output of which operates the feeder 14 of Figures 1 and 2, or any other apparatus desired to be controlled. The ratio of input speed to output speed of the variable speed device 10 can be regulated, as is well understood in the art, by adjustment of shaft 97. The latter is driven through gearing 98 by reversible motor 12. On the output shaft of variable speed device 10 is a sprocket 99 which is connected by a chain 100 to sprocket 101 on shaft 102 of differential speed controller 11. Also attached to shaft 102 is gear 103 which forms one half of a differential for driving pinion 104 journaled on a shaft 105 which in turn is journaled on shaft 102. Synchronous motor 106 is connected to a source of electrical energy through wires 21 and 22 and is slidably mounted on ways 107 and is positioned on said ways by manual adjustment of screw 108. Attached to the shaft of motor 106 is a disc 109 which drives a wheel 110 attached to shaft 111 to drive said shaft in the opposite direction to that of shaft 102. Also on shaft 111 is a member 112 adapted to engage a slidable member 113 splined to shaft 114. Also on shaft 114 is gear 115 forming the other half of the differential for driving pinion 104. Member 113 is normally held disengaged from member 112 by means of spring 116 attached to arm 117. A solenoid 118, in circuit with cam 16 and contactor 18 of transmitter 6 (or with the contactor and cam of transmitter 5 in Fig. 2) is adapted when energized to attract the arm 117. When the telemetric signals from the transmitter energize solenoid 118, arm 117 is attracted thereto, which causes engagement of member 113 with member 112 to drive gear 115 at a speed determined by the relative position of disc 109 with wheel 110. A resilient extension 119 of shaft 105 carries contact 120 which is connected to a source of electrical energy through wire 22. Contact 120 is adapted to engage contact 121 or contact 122 according to the direction of movement of arm 105. Contact 121 is connected to motor 12 by wire 123 and contact 122 is connected to motor 12 by wire 124. The common terminal of motor 12 is connected to a source of electrical energy through wires 125 and 21. Engagement of contact 120 with contact 121 causes rotation of motor 12 in one direction and engagement of contact 120 with contact 122 causes rotation of motor 12 in the opposite direction.

The operation of the apparatus shown in Fig. 5 is as follows: Gear 103, which is driven at a speed proportional to the rate of feeding of the variable speed drive 10, tends to cause contact 120 to engage, for example, contact 121. Gear 115, which is driven in the opposite direction to gear 103 by being connected intermittently to synchronous motor 106, tends to cause contact 120 to engage contact 122. Contacts 121 and 122 are spaced a sufficient distance apart so that when the output speed of the variable speed drive 10 is correct, the contact 120 merely oscillates between contacts 121 and 122 without touching either. If, however, the output speed of 10 is too slow, the differential action of gears 103, 115 and 104 will eventually cause contact 120 to engage contact 122, thereby completing a circuit to motor 12 to cause it to turn shaft 97 in the proper direction to change the speed ratio in 10 to increase the output speed. If the output speed of 10 is too fast, contact 120 will engage contact 121 to cause motor 12 to run in the opposite direction, thereby decreasing the ratio in 10 and slowing its output speed. The result in either case is to bring the output speed of 10 to a value which coincides with the value represented by the time durations of the signals which energize solenoid 118. Referring to Fig. 1, it will be seen that changes in weight on scale 4 produce corresponding changes in the time durations of signals from transmitter 6, and then as described above, the differential speed controller 11 causes the variable speed drive 10 to feed material to scale 3 always in a desired proportion to that on scale 4.

To change the proportion between the weight on scale 3 to that on scale 4, it is merely necessary to change the relative position of disc 109 with roller 110 by means of adjusting screw 108. Moving the motor 106 and disc 109 to the left increases the speed of the roller 110. Assuming that no change in weight on scale 4 has occurred and therefore no change in signal durations to solenoid 118, contact 120 will be moved to engage contact 122, thereby running motor 12 to increase the output speed of 10. The result will be a faster feeding of material to scale 3 or in other words, a greater ratio between the weight on scale 3 to that on scale 4.

Moving the motor 106 and disc 109 to the right produces the opposite effect or a lesser ratio between the weight on scale 3 to that on scale 4.

As previously noted, the belt 2 in Figure 1 may cooperate with a transmitter and totalizer of the type illustrated at 5 and 7 respectively in Fig. 4, in which event signal impulses from contactor 63 and cam 61 will be sent to solenoid 118 in addition to solenoid 95.

It will be seen that the operation of the apparatus shown in Fig. 1 is threefold: first, the totalizing or integrating of weights passing over scale 4, second the totalizing or integrating of weights passing over scale 3, and third, the control of the rate of feeding material to belt 1 in desired proportion to the rate of delivery of material on belt 2.

In Fig. 2, the weight of material passing over scale 3 is totalized or integrated. The rate of feeding material to belt 1 is determined by turning the screw 108 to obtain the desired relation between the disk 109 and the roller 110. The solenoid 118 of the speed controller 11 in this instance is connected to transmitter 5 on scale 3 and it will be understood that in this case the wires 123 and 124 should be transposed at motor 12 so that the drive 10 will be caused to operate more slowly in response to longer signals to solenoid 118 and faster in response to shorter signals. Once the desired rate is set by screw 108, the units 10, 11, and 12 will thus automatically control the feeding to scale 3 to a definite weight per unit time. If a greater or less rate is desired, it is merely necessary to change the position of disc 109 by adjustment of screw 108. Moving disk 109 to the left increases the speed of roller 110, thereby causing contact 120 to engage contact 122 to cause motor 12 to decrease the output speed of unit 10 (the wires 123 and 124 being transposed with respect to their Figure 5 positions when applied to the embodiment in Fig. 2). Immediately the scale measures less weight and therefore transmitter 5 sends shorter signals to solenoid 118 until a balance between the speeds of gears 103 and 115 is reached. Similarly, moving disc 109 to the right produces the opposite effect or control at a greater rate.

The provisions disclosed herein for controlling the rate of delivery of a substance in accordance with a master quantity, such as a set rate or the rate of delivery of another substance, form the subject of my divisional application, Serial No. 307,764, filed December 6, 1939.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, a movable conveyor, means for weighing material thereon, means controlled by said weighing means for transmitting in each of a series of cycles of unvarying time periods a signal of predetermined duration corresponding to unloaded condition of said conveyor plus a duration corresponding to the weight of material thereon, an integrator, means connected to said integrator and continuously operable in a direction for actuating said integrator in a subtractive direction, and means connected to said integrator and operable in each cycle under control of said signals for an extent sufficient to nullify the action of said continuously operable means when the conveyor is unloaded and to operate said integrator additively for an extent corresponding to weight of material on said conveyor in each of a series of cycles.

2. In combination, a movable conveyor, means for weighing material thereon, means controlled by said weighing means for transmitting in each of a series of cycles of unvarying time periods a signal of a duration equal to a constant plus a duration corresponding to the weight of material acting upon said weighing means, an integrator, continuously operable means tending to operate said integrator subtractively, and means responsive to said signals for nullifying the action of said continuously operable means and for operating said integrator additively in each cycle for an extent corresponding to the difference between the signal duration and said constant.

3. In combination, a movable conveyor, means for weighing material thereon, means controlled by said weighing means for transmitting in each of a series of cycles of unvarying time periods current modifications spaced by a time duration corresponding to weights of said material, an integrator, means for operating said integrator subtractively, and means responsive to said current modifications for operating said integrator additively for integrating net weights of material on said conveyor.

4. In combination, a movable conveyor, means for weighing material thereon, means controlled by said weighing means for transmitting cyclical signals corresponding to the weight of material on said conveyor plus an additional amount, integrating means, means controlled by said signals for causing operation of said integrating means in an additive direction, and means for nullifying additive operation of said integrating means to an extent commensurate with said additional amount.

5. In combination, a movable conveyor, means for weighing material thereon, an integrator, means for operating said integrator subtractively, means for operating said integrator additively, driving means for said additive and subtractive operating means, means controlled by said conveyor for regulating the speed of operation of said driving means in accordance with the speed of travel of said conveyor, means controlling the effect of said additive and subtractive operating means upon said integrator, said controlling means including signal transmitting means controlled by said weighing means and means responsive to said signals and controlling the time of operation of said additive operating means.

6. In combination, a movable conveyor, means for weighing material thereon, an integrator, means continuously operable in a direction for operating said integrator subtractively, means for cyclically operating said integrator additively, driving means for said additive and subtractive operating means, means controlled by said conveyor for regulating the speed of operation of said driving means in accordance with the speed of travel of said conveyor, signal transmitting means controlled by said weighing means, and means responsive to signals from said transmitting means to control the time during which said additive operating means is effective to operate the integrator.

RUDY P. LOWE.